United States Patent [19]

Meijer et al.

[11] 4,235,116
[45] Nov. 25, 1980

[54] BALANCED VARIABLE WOBBLE PLATE DRIVE

[75] Inventors: Roelf J. Meijer; Albertus P. J. Michels, both of Ann Arbor, Mich.

[73] Assignee: U.S. Philips Corporation, New York, N.Y.

[21] Appl. No.: 904,529

[22] Filed: May 10, 1978

[51] Int. Cl.³ .............................................. F16H 23/00
[52] U.S. Cl. .................................... 74/60; 74/591; 417/222; 417/269
[58] Field of Search ................... 74/60, 591; 417/222, 417/269; 92/12.2

[56] References Cited

U.S. PATENT DOCUMENTS

| 3,175,363 | 3/1965 | Molly | 91/506 X |
| 3,257,960 | 6/1966 | Keel | 417/269 |
| 3,292,554 | 12/1966 | Hessler | 417/269 |
| 3,319,874 | 5/1967 | Welsh et al. | 417/271 |
| 3,538,706 | 11/1970 | Toepel | 417/269 |

*Primary Examiner*—C. J. Husar
*Assistant Examiner*—Conrad Berman
*Attorney, Agent, or Firm*—David R. Treacy

[57] ABSTRACT

A wobble plate drive mechanism for machines having axial pistons or the like clustered about a shaft. The moving parts are dynamically balanced over a range of wobble plate tilt angles by a balance ring arranged outboard of the wobble plate. The wobble plate restraint has balanced gimbal rings.

10 Claims, 2 Drawing Figures

BALANCED VARIABLE WOBBLE PLATE DRIVE

BACKGROUND OF THE INVENTION

1. Field of the Invention

The invention relates to a wobble plate drive for a cluster of axially reciprocating pistons spaced about a shaft axis; and more particularly to such a drive in which the wobble plate tilt angle with respect to the shaft axis may be varied in order to vary the piston displacement. Drives of this type are known for hydraulic pumps and motors, and have been proposed for multi-cylinder thermodynamic engines.

Because there is not complete uniformity of terminology in this art, the following definitions are applicable to this specification and appended claims.

Swashplate drive refers specifically to a drive having the bearings for reciprocating the individual pistons in direct contact with a swashplate surface that rotates with the shaft. In such a drive, the connection between the piston rod or linkage and the swashplate has both a sliding or rolling relative movement with respect to the periphery of the swashplate, and an oscillating pivoted movement with respect to the swashplate. The sliding or rolling movement is along a surface having circular symmetry about an axis. When the swashplate is tilted so this axis intersects the shaft axis at a given non-zero angle, the oscillating pivotal movement is about a line which normally lies in a plane perpendicular to the swashplate axis. This plane is referred to herein as the driving plane.

A wobble plate drive is a drive having a plate or functionally equivalent member which is coupled through bearings to the bearing surface of a tilted or tiltable element equivalent to a swashplate surface; because of its functional equivalence in the practice of the instant invention, this element will be also referred to as a swashplate. Thus, the word swashplate refers to either a true swashplate or a wobbling element, rotating with a shaft, which is connected by bearings to and defines the wobbling motion of a wobble plate. The wobble plate is restrained from rotation about the shaft axis, and is connected to the piston rods through oscillating pivotal bearings whose pivot axis define a driving plane.

2. Description of the Prior Art

Swashplate drives for hydraulic machines have been in substantial commercial use for a number of years. Because of the high torques and power levels obtainable with hydraulic machines of relatively modest size, extremely rugged shafts and swashplate or wobble plate assemblies have been required. These in turn, are mounted in heavy housings or cylinder assemblies. As a result, only very small vibration amplitudes are transmitted to the machine mounting points.

Many known machines are completely unbalanced insofar as inertia forces caused by piston and piston rod movement and drive mechanism are concerned. For example, it has been common to use a hemispheric thrust plate as the wobble plate or swashplate, the hemispheric assembly itself being relatively massive. An example of this is given in U.S. Pat. No. 3,175,363 which teaches static balancing of an oblique disc used as a wobble plate, and dynamic balancing for overcoming the effect of sudden reduction in the hydraulic load. Dynamic balancing for the torque about an axis perpendicular to and rotating with the shaft due to the inertia of the pistons moving back and forth is not provided. Also, when the plane is tilted, a greater portion of the hemispheric mass is to one side of the shaft than the other, directly producing a radial unbalance.

The significance of radial unbalance has been appreciated and compensated for. For example, in U.S. Pat. No. 3,292,554, a mechanism is disclosed in which a counterweight moves radially to one side away from the shaft as the hemisphere is moved toward the other side of the shaft. Again, however, there is no compensation for the unbalance produced by the inertia forces of the pistons being accelerated in one axial direction at the one side, at the same instant that pistons to the other side of the shaft are being accelerated in the opposite axial direction.

An example of a multi-cylinder thermodynamic engine using a wobble plate drive is given in U.S. Pat. No. 3,319,874. In this patent a relatively complex mechanism is taught which permits varying the stroke of the pistons, while at the same time controlling the compression ratio somewhat independently of the stroke. Because of the lower power and torques encountered in comparison with high pressure hydraulics, the mass of these reciprocating members produces substantial vibration which is less absorbed by a heavy, solid frame. There is, however, no mention or solution of the balancing problem which occurs by reason of the inertia of the pistons and piston rods causing a rotating couple to be produced. An additional embodiment shown in that patent incorporates a hydraulic pump with cylinders directly in line with those of the internal combustion engine, this change clearly being one which will accentuate the problem of vibration due to axial acceleration and deceleration of the pistons.

Similarly, the multi-cylinder hot-gas axial piston engine shown in U.S. Pat. No. 3,538,706 utilizes relatively massive pistons, piston rods and axially moving bearing assemblies for the pistons, so that large uncompensated rotating couples would be produced.

Still more recently, Stirling cycle engines for automotive use have been delivered to Ford Motor Company by N. V. Philips' Gloeilampenfabrieken, incorporating a swashplate drive. These engines have a fixed driving plane tilt angle, and are balanced dynamically by choice of the swashplate mass and dimensions. However, because of the use of a plain swashplate, bearing design is more complex and may be less easily maintained by average automotive mechanics than drives having standard bearing types.

SUMMARY OF THE INVENTION

An object of the invention is to provide a variable displacement wobble plate drive mechanism which is balanced to compensate for oscillating inertia forces, yet is light in weight and relatively compact.

A further object of the invention is to provide a wobble plate drive having a balanced restraining mechanism for the wobble plate.

According to a first aspect of the invention, a balanced wobble plate drive mechanism has a swashplate mounted to a shaft for rotation with the shaft, a wobble plate connected to the swashplate, at least three reciprocating member assemblies connected to the wobble plate for reciprocating motion in response to shaft rotation, and balancing ring arranged outboard of the wobble plate but mounted to and moving with the swashplate, the swashplate and balancing ring together having a combined mass whose center of gravity lies on the shaft axis and in the driving plane, and centrifugal forces on the mass counterbalance oscillating inertia forces. Preferably, the balancing ring and swashplate are shaped substantially as bodies of revolution about the swashplate axis, so that each is symmetrical about a plurality of planes through the swashplate axis (that is, planes in which the axis lies). Further, the center of gravity of their mass combined with that of the wobble plate lie in the driving plane.

In a preferred embodiment according to the invention, the wobble plate is restrained by a balanced homokinetic coupling constant velocity joint) connecting it to the machine frame.

According to a further preferred embodiment of the invention, a wobble plate drive mechanism for a four piston thermodynamic engine has the wobble plate restrained by a constant velocity, or homokinetic, unit having a first gimbal section connected to the wobble plate about an axis perpendicular to and passing through the swashplate axis a given distance from the intersection of the driving plane and the shaft axis. Preferably, the first gimbal rotation is prevented by a second gimbal section pivoted about an axis intersecting the shaft axis an equal given distance from the intersection of the driving plane with the shaft axis, the two gimbal sections being interconnected at a point equally distant from both gimbal pivot axes.

The use of the outboard balancing ring with the wobble plate drive provides both a flywheel effect which is advantageous for thermodynamic engines such as a Stirling engine, and enables balancing of the inertia forces of the pistons and connecting rods by reason of the action of centrifugal force on the balancing ring while it is tipped, without adding greatly to the machine weight.

Further, it can be shown mathematically that for small to moderate angles of tilt, the reciprocating inertia forces and the centrifugal restoring force increases in approximately the same proportion with the changing angle of tilt, so that adequate balancing is obtained for different control angles of the wobble plate.

The invention will be described in greater detail hereinafter with respect to the drawing.

DESCRIPTION OF THE PREFERRED EMBODIMENTS

Figure 1:
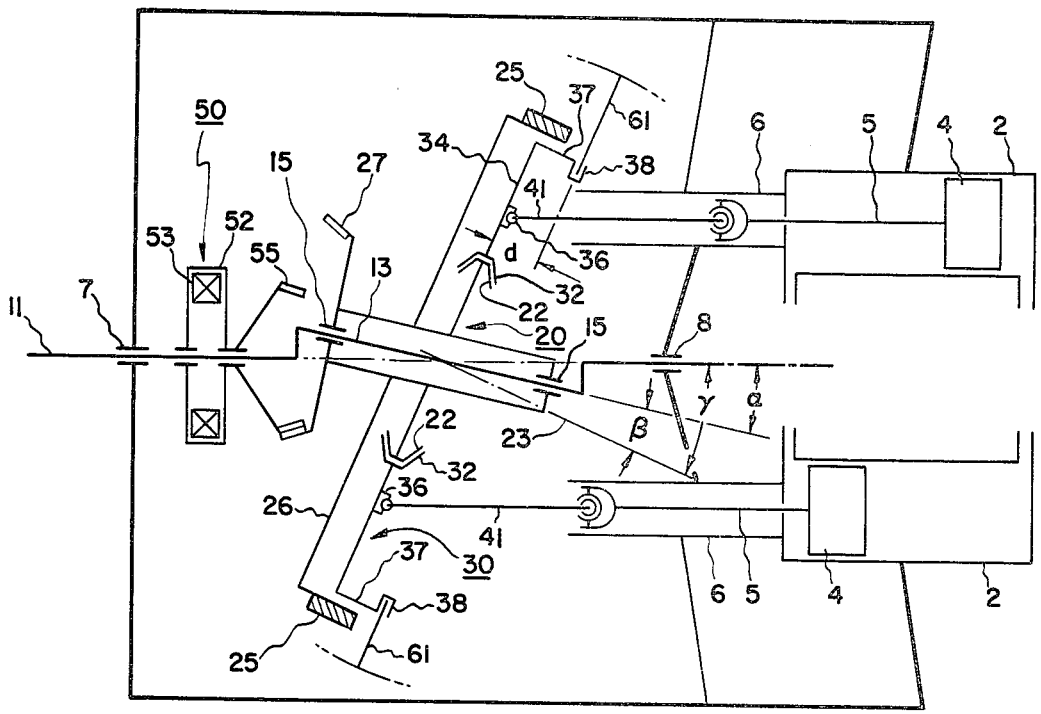
FIG. 1 is a diagrammatic side view of a thermodynamic engine having a drive mechanism according to the invention, the crankshaft being in a position in which the wobble plate has a maximum tilt with respect to the horizontal, the restraining gimbals for the wobble plate being largely omitted.

FIG. 1 shows diagrammatically a variable displacement wobble plate drive mechanism for a four cylinder thermodynamic engine, such as a Stirling engine. Such a machine would have typically a frame 1 in which four identical cylinders 2 are mounted, the cylinders being provided with means for supplying and removing heat from the cylinders, and for conducting gas to and from the cylinders by interconnections which are well known in that art, and are omitted from the drawing for the sake of simplicity. Each cylinder contains a double acting piston 4 having a piston rod 5 extending through one end of the cylinder, the far end of the piston rod being guided in a fixed slide 6. The frame 1 also supports and locates the main shaft bearings 7 and 8.

A shaft 11 is mounted for rotation in the bearings 7 and 8, in this embodiment the shaft having a diagonally offset portion 13 from whose shape the descriptive term "Z-shaft" is obtained. The portion 13 has surfaces for bearings 15 which may, for example, be opposed tapered roller bearings or any other well known bearing which is capable of carrying high forced loads. For control by a mechanism to be described below, the bearings 15 support a swashplate 20 during constant power operation of the engine, when the displacement is not to be changed, the swashplate 20 rotates with the shaft 11 and there is no relative rotation by way of the bearings 15. The swashplate 20 is provided with bearing surfaces 22 concentric with a swashplate axis 23 which, for reasons to be described below, is skewed with respect to the axis of the bearings 15 by an angle $\beta$. The diagonally offset shaft portion 13 is at an angle $\alpha$ with respect to the shaft axis. When the shaft axis, the diagonally offset portion axis, and the swashplate axis 23 lie in one plane, the tilt angle $\gamma = \alpha + \beta$, (or $\alpha - \beta$ when the offset angles are aligned subtractively). In accordance with the invention, formed integrally with the swashplate 20, or rigidly fastened to it is a balance ring 25 which will generally be formed as a thick rim supported from the central part of the swashplate 20 by a web 26. Also forming part of the swashplate 20 assembly is a conical gear 27 used, as will be described below, for controlling and varying the tilt angle of the driving plane with respect to the shaft.

A wobble plate 30 is connected via bearing surfaces 32 to the corresponding bearing surfaces 22 of the swashplate 20. The bearing surfaces 22 and 32 must transmit the full thrust of the pistons 4, and withstand the full rotation of the shaft 11, so that the preferred form of connection is by opposed tapered roller bearings, or other form of anti-friction bearing such as ball bearings or pressure lubricated plane bearings. The wobble-plate 30 consists basically of a plate 34, extending outwardly from the bearing surfaces 32, on which connecting rod pivots 36 are mounted. To prevent the wobble plate from rotating with respect to the frame 1 and the fixed slides 6, the plate 34 has two arms 37 extending in the direction of the swashplate axis, in a direction away from the web 26. At the end of the arms 37 pivots 38 are formed, the two pivots 38 defining a gimbal pivot axis which is perpendicular to and intersects the swashplate axis so as to be parallel to and spaced from the driving plane by a distance d.

Connecting rods 41 extend between the pivots 36 on the wobble plate and the ends of the piston rods 5 on the fixed slide 6. Of course, it will be clear that where the swashplate tilt angle $\gamma$ is not very great, if a single acting piston and cylinder combination is used rather than the double acting system shown, then the slide 6 may be omitted and the connecting rod 41 would extend directly to the piston 4.

To provide controllable movement of the tilt angle $\gamma$, rather than the known axial piston arrangement which will directly tilt either the wobble plate or the swashplate, in the preferred embodiment a rotary control movement is used which takes advantage of the properties of the Z-shaft. A hydraulic drive assembly 50 is mounted on the shaft 11, and during normal operation rotates with the shaft. To provide control movement, the outer case 52 of the hydraulic drive assembly 50 is made to rotate with respect to the shaft 11. This may be achieved by using a low speed rotary hydraulic motor of any well known type, whose rotor 53 which is shown schematically is fixed to the shaft. Alternatively, a higher speed, lower torque motor may be utilized, connected by gearing internal to the case 52 to provide the relatively slow rotation of the case 52 which is required. Connected to the case 52 is a conical gear 55 whose teeth mesh at one point with the teeth of the conical gear 27 on the swashplate 20. Because of the use of the Z-shaft, it will be clear that when the conical gear 55 rotates, the swashplate 20 will rotate about the diagonally offset portion 13 so that the swashplate axis 23 moves in a fashion similar to nutation about the axis of the shaft offset portion 13. This can occur while the entire rotating assembly is in motion delivering power. By this relative rotation of the swashplate 20 about the offset portion 13, the tilt angle $\gamma$ of the driving plane is thus made to vary between extremes of $\alpha+\beta$ to $\alpha-\beta$.

It will be clear that control signals can be provided to the drive assembly 50 of the control by any well known means, such as the flow of hydraulic fluid through a passage in the shaft 11.

Figure 2:
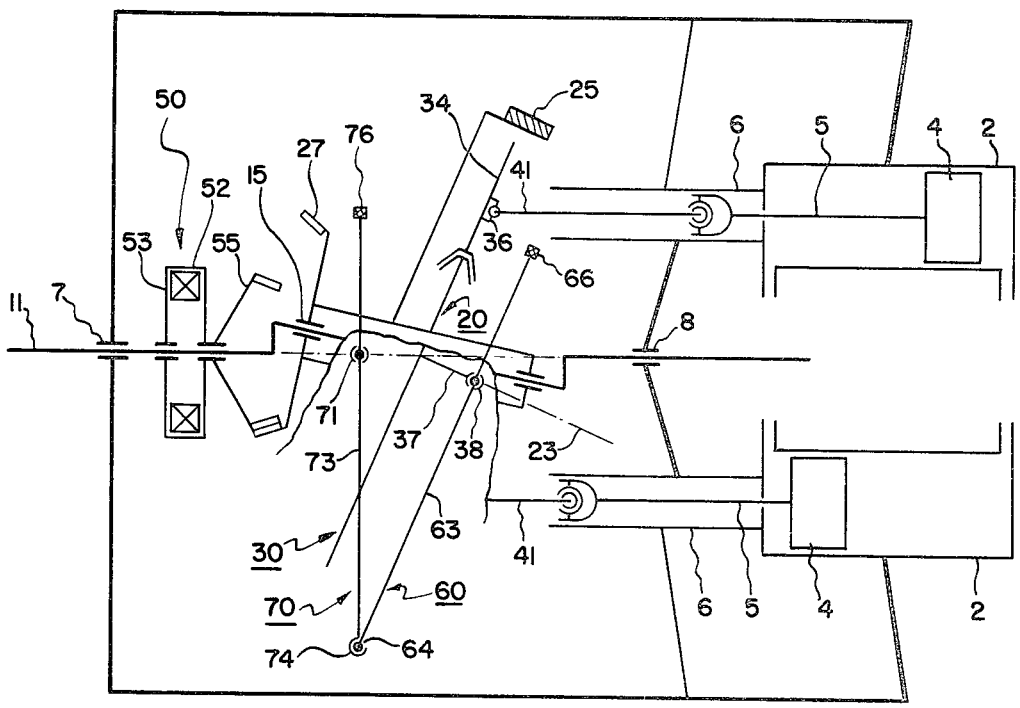
FIG. 2 is a partial diagrammatic plan view of the mechanism of FIG. 1, showing the position of the wobble plate restraining gimbals when the shaft is rotated 90° from the position shown in FIG. 1.

In FIG. 2 the rotating elements have moved 90° with respect to the relative positions shown in FIG. 1, with the tilt angle $\gamma$ of the driving plane remaining unchanged. Thus, in this top view the region of contact between the conical teeth 55 and 27 is now at the same level as the axis of the shaft 11, rather than being at a bottom position as shown in FIG. 1. For clarity in presentation of the means for restraining rotation of the wobble plate, the connecting rod and portions of the swashplate 20 and wobble plate 30 are omitted from the lower part of the Figure. Also, in this position of the engine the pivot axis determined by the pivots 38 is vertical. A first gimbal 60 is pivotally connected to each of the pivots 38 by radially extending pins 61 shown in FIG. 1. Preferably, the gimbal 60 consists primarily of a semi-circular ring 63 having an inside diameter which is sufficiently great so that the balance ring 25 can swing clear inside the ring 63. At a far end 64 of the ring, a pivot connection is provided which prevents rotation of this point with respect to the axis of the shaft 11, while to the opposite side of the gimbal pivot axis determined by the pivots 38 and pins 61 counterweights 66 are provided. Alternatively, it may be preferable to form the gimbal as a complete ring in which case, rather than counterweights 66, only a small additional weight may be required at the point which is diametrically opposite to the far end 64.

To prevent movement of the far end 64 about the shaft 11, a second gimbal 70 is mounted to the frame 1 by pivots 71 diametrically opposed each other, about an axis perpendicular to and intersecting the axis of the shaft 11. The gimbal 70 consists primarily of a ring 73 having a far end 74 pivotally connected to the gimbal 60 the interconnection preferably beinng formed by a ball joint or a universal type of joint which allows slight pivoting of the gimbal 60 upward and downward about the end 64 as the wobble plate wobbles from a position in which it points downward to a position in which it points upward. Additionally, the gimbal 70 has counterweights 76 which are shown as concentrated masses placed to a short distance opposite to the far end 74; as in the first gimbal 60, it may be desirable to form a complete ring in which case only additional mass is required sufficient to compensate for the effect of the interconnection at the end 74.

From the foregoing description, it will be clear that this embodiment provides static balancing of all of the elements, so that in normal operation all of the moving elements that pivot do so about a line through their center gravity. Thus, no particularly annoying oscillating forces produce a vibration in the machine, but only oscillating moments. Further, it will be clear that with this construction the effect of pivoting of the first gimbal 60 and the wobble plate 30 is nearly identical. These forces as well as the forces resulting from the inertia of the pistons and their drive rods may be almost completely counterbalanced by the centrifugal force acting on the mass of the rotating swashplate and its balance ring 25.

It will be clear to those of ordinary skill in the art that many design variations from this embodiment can utilize the invention. The balance ring can consist of a number of discrete weights fixed to a spider, having any configuration permitting attachment so that it rotates with the swashplate. Rather than a Z-shaft, any conventional means for tipping control can be used; and the invention is fully usable with a fixed angle wobble plate.

The shapes of the restraint gimbals of the constant velocity joint are not critical. They may be shaped as forks, or as a single generally radial element so long as proper offsets are provided axially to clear the rotating and wobbling parts.

The orientations given are referred to for convenience. Gimbal axes can be at other angles. Rather than pistons, elements with other functions requiring similar motion may advantageously utilize this drive. Also, pistons, cylinders, etc. need not be equal size or evenly spaced outwardly if radius and mass are varied so that dynamic balancing is possible.

We claim:

1. A balanced variable displacement drive mechanism for a cluster of axially reciprocating members comprising:

a shaft having an axis, means for mounting the shaft for rotation about the shaft axis, a wobble plate having means for defining a driving plane, a swashplate having an axis perpendicular to said driving plane, bearing means so connecting said wobble plate to said swashplate that the driving plane is maintained perpendicular to the swashplate axis, means for mounting the swashplate to the shaft for rotation therewith about the shaft axis, and for control movement with respect to the shaft, said control movement tilting the driving plane about a tilt axis perpendicular to and intersecting the shaft axis, means for restraining the wobble plate from rotation about the shaft axis, at least three reciprocating member assemblies; each assembly comprising a member, means for mounting the member for reciprocating motion in an axial direction parallel to said shaft axis, and means for connecting the member to the wobble plate for reciprocating motion in response to shaft rotation as a function of the angle of tilt of the driving plane, and a circular symmetrical balancing ring connected to said swashplate for movement therewith, spaced outward from said wobble plate and intersected by the driving plane; the swashplate and balancing ring together having a combined mass so arranged that the center of gravity of said mass lies in said driving plane, and centrifugal forces on the mass counterbalance other oscillating inertia forces.

2. A mechanism as claimed in claim 1 wherein said means for restraining the wobble plate comprises a first gimbal section pivotally connected to said wobble plate about a pivot axis parallel to and spaced from the driving plane and intersecting said swashplate axis.

3. A mechanism as claimed in claim 2 wherein said first gimbal section is balanced about the gimbal pivot axis, inertia forces due to wobbling movement of the pivot axis being substantially counterbalanced.

4. A mechanism as claimed in claim 2 wherein said means for restraining includes a second gimbal ring pivotally mounted about a non-rotating axis perpendicular to and passing through the shaft axis at a location spaced from the intersection of the driving plane with the shaft axis distance equal to the distance between the driving plane and the first gimbal pivot axis, said gimbal rings being pivotally interconnected at a point equidistant from the respective gimbal pivot axes.

5. A balanced drive mechanism for a multi-cylinder axial piston machine comprising:
   a machine frame,
   a shaft having an axis,
   means for mounting the shaft in the frame for rotation about said axis,
   a swashplate mounted on and rotating with said shaft,
   at least three cylinders mounted to said frame and having axes parallel to said shaft axis, equally spaced from said shaft axis and from each other,
   at least three pistons disposed in respective cylinders,
   a wobble plate mounted by bearing means on said swashplate, said bearing means defining a swashplate axis, said wobble plate arranged to define a driving plane having a tilt angle about a tilt axis, and
   means for restraining the wobble plate from rotation about said shaft axis, comprising a constant velocity joint coupling the wobble plate to the machine frame, said constant velocity joint having at least one dynamically balanced section.

6. A mechanism as claimed in claim 5, wherein said at least one dynamically balanced section comprises a first gimbal section pivotally connected to said wobble plate about a pivot axis parallel to and spaced from the driving plane and intersecting said swashplate axis, said gimbal section extending generally to one side and terminating at a far end, said gimbal section having a portion extending opposite to said far end and having a mass which balances said gimbal section about the gimbal pivot axis.

7. A mechanism as claimed in claim 6, wherein said far end is disposed outward from said balance ring, said gimbal being arranged so that said wobble plate and ring can wobble and rotate respectively clear inside the gimbal.

8. A mechanism as claimed in claim 7 wherein said means for restraining includes a second gimbal ring pivotally mounted to the machine frame about a non-rotating axis perpendicular to and passing through the shaft axis at a location spaced from the intersection of the driving plane with the shaft axis a distance equal to the distance between the driving plane and the first gimbal pivot axis, said gimbal rings being pivotally interconnected at said far end at a point equidistant from the respective gimbal pivot axes.

9. A mechanism as claimed in claim 8 additionally comprising means for controlling the tilt angle of the driving plane over a range of tilt angles, a first portion of said means for controlling being mounted on said swashplate; said means for restraining comprising a first gimbal section pivotally connected to said wobble plate about a pivot axis perpendicular to and passing through the swashplate axis; said combined mass including said first portion, and said other oscillating inertia forces including the effect of movement of the first gimbal section.

10. A mechanism as claimed in claim 7 additionally comprising means for controlling the tilt angle of the driving plane over a range of tilt angles, a first portion of said means for controlling being mounted on said swashplate; said means for restraining comprising a first gimbal section pivotally connected to said wobble plate about a pivot axis perpendicular to and passing through the swashplate axis; said combined mass including said first portion, and said other oscillating inertia forces including the effect of movement of the first gimbal section.

* * * * *